J. C. Stoddard.
Horse Rake.

No. 107,832. Patented Sep. 27, 1870.

Witnesses
D. A. Reed
J. Getmold

Inventor
J. C. Stoddard

United States Patent Office.

JOSHUA C. STODDARD, OF WORCESTER, MASSACHUSETTS.

Letters Patent No. 107,832, dated September 27, 1870.

IMPROVEMENT IN HORSE HAY-RAKES.

The Schedule referred to in these Letters Patent and making part of the same.

*To all whom it may concern:*

Be it known that I, JOSHUA C. STODDARD, of the city and county of Worcester, State of Massachusetts, have invented certain new and useful Improvements in Horse Rakes; and I do hereby declare the following to be a full, clear, and correct description of the same, due reference being had to the accompanying drawing by the letters marked thereon.

In said drawing—

The same letters indicate the same parts in both figures, where they occur.

Figure 1:
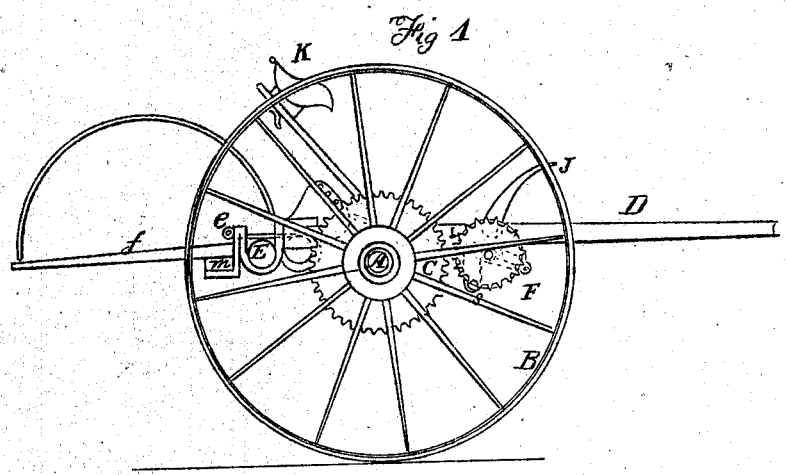
Figure 1 shows a side view of my improved rake.
Figure 2:
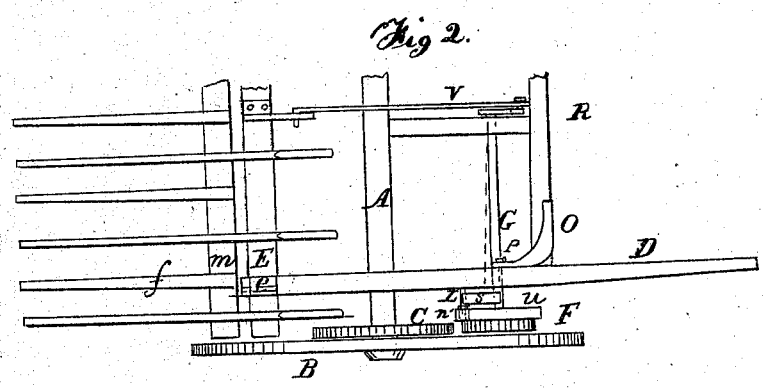
Figure 2 is a partial plan view.

A is the axle, with its wheels B, to one of which is fastened the gear C.

D are the thills, fastened to the axle, and extended back, and supporting the rake E, the head of which turns in suitable bearings on D.

F is a pinion, fitting into the gear C, when its shaft G is pressed down by the lever J, which compresses the spring S.

K is the driver's seat, supported from the axle A.

u is a rim wheel, attached to the pinion F, its rim being internally recessed at two opposite points, in which the roll n can enter, and allow the pinion to spring out of mesh with C, the spring S throwing it out.

The rod L, supporting the roll n, is made with elasticity enough to allow the gear-wheels to separate and run over a tooth or slight obstruction, and their (the gear) teeth are made pointed, to enter easily again.

The lever J is hung at r, and has a notch bearing on the shaft G, so that, by pressing forward or downward the upper end of the lever, the pinion F is thrown into gear with the wheel C.

R is an arm on the end of the shaft G, and is connected to the rake by the rod v.

This invention, being an improvement on the invention patented by me in 1860, and again in 1869, many of the parts are similar in construction and same in arrangement, but the addition of some, and the different arrangement and operation of the whole, render this a much more efficient and perfect device.

The operation is evident from the above construction, the lever J giving the driver ready control over the rake E, so that a slight pressure of the foot throws the gear into engagement, and turns up the teeth of the rake between the clearers $f$, whose rod $m$ may be supported from the bearings of the rake, the pin $e$ preventing any accidental displacement of the rake.

I claim—

1. The combination, with the axle, rake-head, and clearer finger-bar, of the open bearing-arms or supports for the rake-head, finger-bar, and clearing-fingers, when the same are constructed, arranged, and applied as herein shown and described.

2. The arrangement, with relation to the shaft G, of the lever J and the spring S, and pin L, whereby the engagement and disengagement of the gearing are effected.

3. The combination and relative arrangement, with the main frame and supporting-wheels, of the driver's seat, the rake-head, open bearing-arms, supporting the rake, the clearers, shaft G, lever J, and connections R V, all being constructed and arranged with relation to each other, and for the purposes set forth.

4. The combination, with shaft G and pin L, of spring S, made in the form and applied in the manner described.

5. The combination of the rake hinged behind the axle, the open bearing-arms or supports for the rake and clearing-fingers, and the operating mechanism, composed of the shaft G, with arm R, connecting-rod V, gear C, attached to wheel B, toothed wheel F, recessed rim-wheel u, spring S, pin L, with roller n and the treadle J, all constructed and arranged to operate substantially as herein shown and described.

J. C. STODDARD.

Witnesses:
D. A. REED,
J. G. ARNOLD.